United States Patent
Westermann (10) Patent No.: US 10,816,105 B2
(45) Date of Patent: Oct. 27, 2020

(54) VALVE DRIVE SYSTEM FOR A PNEUMATIC OR HYDRAULIC VALVE

(71) Applicant: Buerkert Werke GmbH & Co. KG, Ingelfingen (DE)

(72) Inventor: Jan Westermann, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 58 days.

(21) Appl. No.: 16/154,808

(22) Filed: Oct. 9, 2018

(65) Prior Publication Data
US 2019/0107220 A1    Apr. 11, 2019

(30) Foreign Application Priority Data
Oct. 9, 2017    (DE) .......................... 10 2017 123 376

(51) Int. Cl.
*F16K 31/122*    (2006.01)
(52) U.S. Cl.
CPC ........ *F16K 31/1221* (2013.01); *F16K 31/122* (2013.01)
(58) Field of Classification Search
CPC ............................ F16K 31/1221; F16K 31/122
USPC .................................................. 251/62, 63.5
See application file for complete search history.

(56) References Cited

U.S. PATENT DOCUMENTS

| | | | | |
|---|---|---|---|---|
| 2,638,124 | A | * | 5/1953 | Nickerson ............. F16K 31/122 251/62 |
| 4,934,652 | A | * | 6/1990 | Golden .................... E21B 34/02 251/327 |
| 5,487,527 | A | * | 1/1996 | Eggleston ........... F16K 31/1228 251/62 |
| 5,746,079 | A | | 5/1998 | Hettinger et al. |
| 7,191,791 | B2 | | 3/2007 | Burmester |
| 8,322,364 | B2 | * | 12/2012 | Lacasse .............. F16K 27/0281 137/270 |
| 2006/0108550 | A1 | | 5/2006 | Burmester |
| 2009/0139587 | A1 | | 6/2009 | Spliethoff et al. |

FOREIGN PATENT DOCUMENTS

| | | |
|---|---|---|
| DE | 3133273 A1 | 3/1983 |
| DE | 29508401 U1 | 11/1995 |
| DE | 10336065 A1 | 3/2005 |
| DE | 102004049512 A1 | 4/2006 |
| DE | 102007058253 A1 | 6/2009 |
| DE | 102014013390 A1 | 3/2016 |
| WO | 2004015314 A1 | 2/2004 |
| WO | 2007128360 A1 | 11/2007 |

\* cited by examiner

Primary Examiner — Umashankar Venkatesan
(74) Attorney, Agent, or Firm — Dilworth IP, LLC (57) ABSTRACT

A valve drive system for a pneumatic or hydraulic valve is provided, comprising a drive unit and at least two cup-shaped upper casing parts having different geometries, wherein the drive unit comprises a sleeve, a piston being movable in the sleeve in a linear way, a drive spindle mounted on the piston, and a mounting portion, wherein each of the cup-shaped upper casing parts is couplable by means of the mounting portion to the drive unit, to close the valve drive system to the upper side.

17 Claims, 5 Drawing Sheets

Fig. 5

VALVE DRIVE SYSTEM FOR A PNEUMATIC OR HYDRAULIC VALVE

The present invention relates to the valve drive system for a pneumatic or hydraulic valve.

BACKGROUND

In state of the art process valves, a flow of fluids may be controlled in a precise way. However, in complex manufacturing plants access to valve ports, for example for connecting fluid lines for a pneumatic or hydraulic valve, is a challenge. Furthermore, it is advantageous for connecting any equipment to provide the ports on different locations in order to be compatible to a broad variety of equipment. Thus, it is necessary to provide customized connection options depending on the use case. Customized solutions however correspond to higher expenses, as the manufacturing process has to be adapted and a larger number of different parts has to be kept on stock or exchanged.

SUMMARY

Thus, it is an objective of the present invention to provide a valve drive system, which is highly customizable and may be adapted to different mounting space situations by using the smallest possible variety of parts.

This task is solved by a valve drive system according to the invention for a pneumatic or hydraulic valve, comprising a drive unit, that is exactly one drive unit, and at least two cup-shaped upper casing parts having different geometries, wherein the drive unit comprises a sleeve, a piston being movable in the sleeve in a linear way, a drive spindle mounted on the piston and a mounting portion, and wherein selectively each of the cup-shaped upper casing parts is couplable by means of the mounting portion to the drive unit to close the valve drive system to the upper side.

Such kind of valve drive system has the advantage that, depending on the use case, the most suitable upper casing part may selectively be connected to the drive unit in order to produce a valve. Here, the drive unit comprises any identical parts of the valve drive system. Thus, the valve drive system is a modular system, where only the upper casing parts vary and thus different valve drives may be combined.

Together, the upper casing part and the drive unit form a closed valve drive, in case the upper casing part is correctly mounted on the drive unit. That means, the upper casing part closes the adjacent pressure chamber, which is positioned on a side of the piston. Without the upper casing part, the drive unit would not function, and would not be pressure tight on a front face.

The upper casing parts preferably are formed in an integral way. This way, the upper casing parts are easy to be handled during mounting.

According to an embodiment each upper casing part has a mounting portion corresponding to the mounting portion of the drive unit. Thus, the upper casing parts may be connected to the drive unit in a simple way. For example, the drive unit has a thread and each upper casing part a respectively corresponding thread, thus the upper casing parts may be selectively screwed on the same drive unit.

The mounting portion is preferably provided on a sleeve, and is in particular connected thereto in an integral way, for example as outer thread. Due to the cylindrical shape of the sleeve a thread may be provided in the especially simple way. Further, the outer dimensions of the sleeve nearly correspond to the inner dimensions of the upper casing parts, thus by using the mounting portion, no large distances have to be bridged between the sleeve and the upper casing part.

The upper casing parts may at least comprise a sealing for sealing against the sleeve. The sealing may be located on a surrounding edge of an open end of the upper casing part, thus the inner space of the drive unit is sealed towards the outside, when the upper casing part is correctly mounted to the drive unit. Said sealing is required in order to prevent a leaking of pressurized air during operation of the pneumatic valve. The same is true for a hydraulic valve.

In addition, the upper casing parts may at least include a further sealing on the inner wall. For example, said additional sealing acts to separate the fluid flow in two pressure chambers in the valve drive from each other. Here, the at least one additional sealing may be arranged on the inner side wall or on an upper side of the upper casing part. The pressure chambers may optionally filled with pressurized air or another fluid in order to drive the valve.

The sealings may be directly injection molded or glued to the upper casing parts. In an alternative embodiment, the sealings may also be separate components of the valve drive system. Alternatively or in addition, in the casing part an insert may be inserted, which comprises at least one seal.

In a state mounted on the drive unit, the upper casing parts may enclose the sleeve around the periphery and enclose the upper side. Thus, the valve comprises a mostly flush surface, thus the valve is easy to clean. In other words, the upper casing part extends in the longitudinal direction, preferably nearly completely or completely, across the sleeve, in particular, as seen in side view to a lower end of the sleeve, when an upper casing part is mounted to the drive unit. It is also conceivable that the upper casing part extends further downwards beyond the sleeve in a mounted state. The lower end of the sleeve is an end aligned towards the process valve. In particular, the longitudinal direction corresponds to the movement direction of the piston which is movable supported in the sleeve.

According to a preferred embodiment, a spindle tube enclosing the drive spindle is provided, onto which spindle tube a lower side bottom of the sleeve abuts to close a cylindrical chamber to the spindle tube. This way, the drive unit may be closed on a side facing towards the process valve. For example, the lower side bottom of the sleeves comprises a step, which may abut on a corresponding step of the spindle tube. In addition, a sealing may be arranged between the spindle tube and the sleeve or the lower side bottom of the sleeve.

The spindle tube is in particular adapted to connect the process valve with the drive unit. Alternatively or in addition, a flange may be provided on the lower side button of the sleeve in order to connect the drive unit with a process valve.

Preferably, each upper casing part comprises at least one fluid port, wherein the upper casing parts are distinguished by different positions of the fluid ports thereof. Here, the advantage is achieved that different variants of the valve drives may be manufactured in a particularly simple way by selectively connecting different upper casing parts to the drive unit. Thus, the upper casing part may always be mounted to the drive unit, which provides the best access to the fluid ports, when the valve is mounted in a plant.

The fluid ports always extend in an assigned pressure chamber, wherein the pressure chambers are the both chambers arranged adjacently to the piston, across which the piston is moved during the fluid inlet.

The upper casing parts may comprise one or more fluid ports arranged on the front face or laterally. Hereby an access to the fluid ports from any side may be provided.

Particularly preferred, at least one upper casing part may comprise solely only one or more fluid ports arranged on the front side thereof and at least one other upper casing part may comprise one or more fluid ports which are arranged solely laterally. "Solely" denotes that the upper casing part including one/more front face fluid ports has no other fluid ports apart from front side fluid ports and the upper casing part including one/more lateral fluid ports has no other fluid ports than laterally arranged fluid ports. This way, access to the fluid ports may be enhanced regarding the installation space situation.

In addition, the upper casing parts may comprise additional ports, for example electrical and/or optical connections.

According to an embodiment, the piston divides the cylindrical chamber into a first pressure chamber above the piston and into a second pressure chamber beneath the piston, wherein a first fluid port is fluidly connected to the first pressure chamber and/or a second fluid port is fluidly connected to the second pressure chamber, when one of the upper casing parts is mounted to the drive unit.

In order to move the piston, fluid may be introduced in the respective pressure chamber in order to cause the desired movement of the piston upwards and downwards in the longitudinal direction of the valve. Alternatively or in addition, the drive unit may comprise a spring, which pressurizes the piston in one direction. Hereby, a fluid port may communicate with a pressure chamber such that introducing a fluid in the pressure chamber moves the piston against the spring force.

By movement of the piston, a drive spindle is moved, which is fixedly secured to the piston. Said drive spindle again moves a closing element having a sealing in the process valve, whereby the fluid flow is controlled by the process valve.

Depending on the purpose, the spring may be mounted in the upper or lower pressure chamber. Due to that, in an unpressurized drive, the drive spindle is moved into a predetermined position, in particular in the unpressurized opened position (NO) or in the unpressurized closed position (NC). Preferably, at least one flow channel, which is coupling the pressure chamber to a fluid port is formed between the sleeve and an upper casing part and is delimited thereby, when the upper casing part is arranged on the drive unit. The flow channel is thus formed automatically when the upper casing part is mounted to the drive unit. This way, deployment of a valve may be particularly simple.

For example, two flow channels, where the fluid flows thereof are separated, are formed between the sleeve and the upper casing part when the upper casing part is arranged on the drive unit, the flow channels each extending from an associated fluid port to the cylindrical chamber, in particular to a pressure chamber. This provides the advantage that each pressure chamber may be controlled by a fluid port, in particular may be filled with a fluid.

In case, an upper casing part is mounted with two front face fluid ports on the drive unit, a single flow channel is formed between the sleeve and the upper casing part and is delimited thereof, and leads to the second pressure chamber, whereas the other fluid port leads from the upper side in the first pressure chamber. In case, an upper casing part comprising two lateral fluid ports is mounted on the drive unit, two flow channels will be formed between the sleeve and an upper casing part, in which the fluids thereof are separated from each other, and are delimited thereby, and each extend to a pressure chamber. This way, it is ensured that always two pressure chambers are connected to a fluid port, and the valve may be operated in a correct way.

The at least one flow channel may comprise a variable cross-section in the axial direction. This may ensure that during connecting an upper casing part to the drive unit, the fluid ports are always in communication with the provided flow channel. In particular, a portion of the flow channel may extend across the complete periphery of the sleeve.

On the outer side of the sleeve an annular circumferentially closed portion may extend, which with respect to the upper casing part having two lateral fluid ports fluidically separates two annular chambers, which are arranged one above the other in the axial direction, one of them comprising an opening to the first and one comprising an opening to the second pressure chamber, in particular where the mouths of the fluid ports in the annular chambers are arranged axially offset to one another. Depending on the route of the channel in the upper casing part, the fluid ports may be arranged one above the other or adjacent to one another on the upper casing part. The annular portion may comprise a groove, in which a sealing mounted to the upper casing part may engage. Thus, both pressure chambers may be sealed against one another in a simple way.

The flow channel may extend sectionwise through a recess in the mounting portion of the drive unit and/or may be formed in the mount portion of the upper casing parts. In this way it is achieved that the flow channel is formed when the upper casing part is mounted on the drive unit. For example, the flow channel comprises a groove in the mounting portion of the drive unit and/or of the upper casing part. When the upper casing part is mounted on the drive unit, a flow channel is formed by the groove which flow channel extends through the valve drive.

According to an exemplary embodiment, the flow channel comprises an annular chamber and a portion extending in the axial direction. The annular chamber is preferably located on the height of the drive unit, onto which a fluid port which is arranged laterally in the upper casing part abuts. This provides the advantage that the lateral fluid port along the periphery of the drive unit is always in communication with the flow channel. Thus, during mounting of the upper casing part the alignment of the upper casing part has not to be taken into consideration.

Of course, on the upper casing part and thus also on the drive a control button, a controller or a position indicator may be applied, which may have a cover-like configuration. The separate units do not correspond to the upper casing part, which closes the drive unit, but are individual parts outside of the already closed drive casing.

BRIEF DESCRIPTION OF THE DRAWINGS

Further features and advantages of the invention will become obvious from the following description and the appended claims which will be referenced. In the figures:

DETAILED DESCRIPTION OF THE INVENTION

Figure 1:
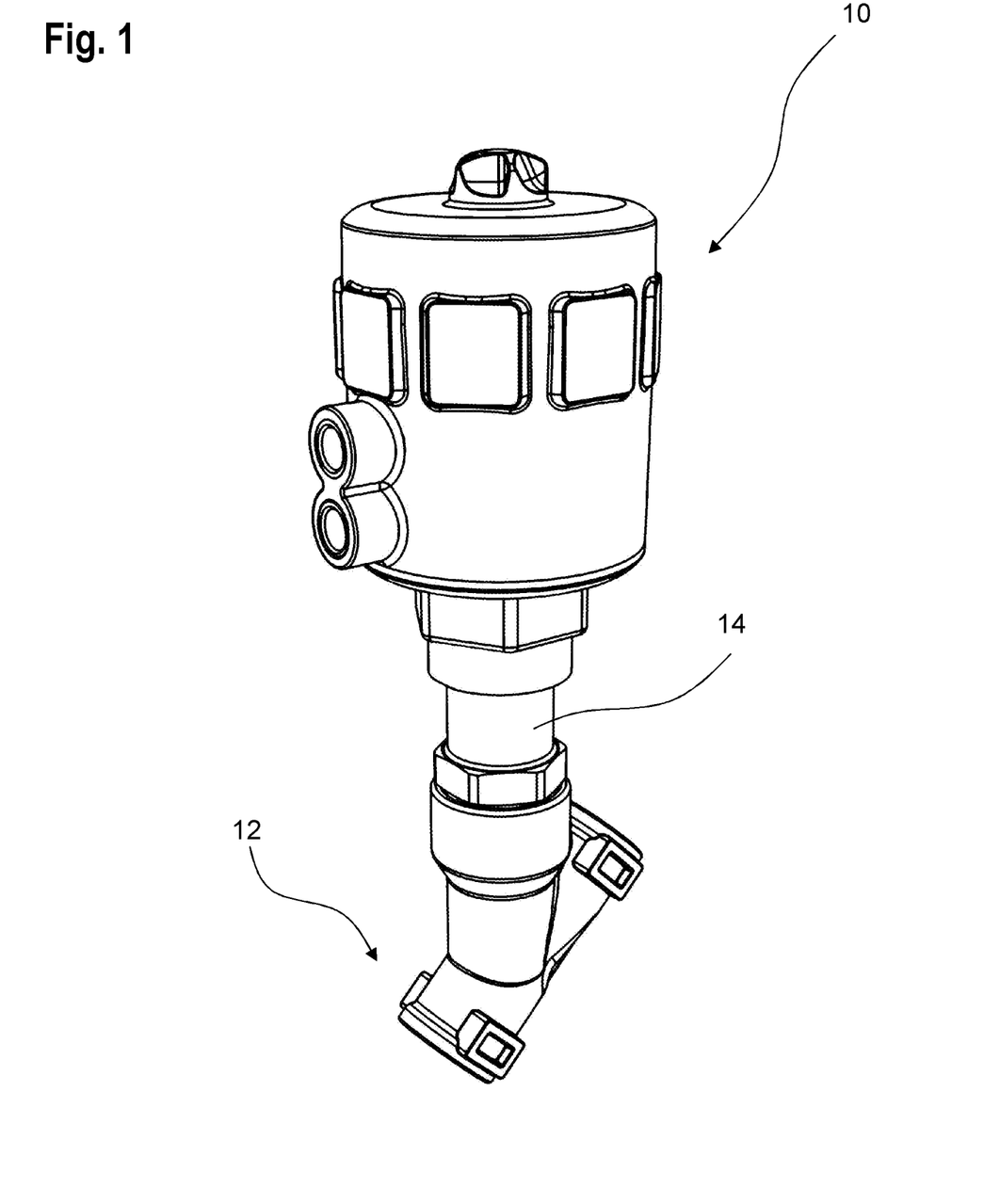
FIG. 1 shows a process of a valve comprising a valve drive system according to the invention.

FIG. 1 shows a valve drive system 10, which is mounted to a process valve 12. The process valve 12 and the valve drive system 10 are fixedly secured to each other by a spindle tube 14.

Figure 2A:
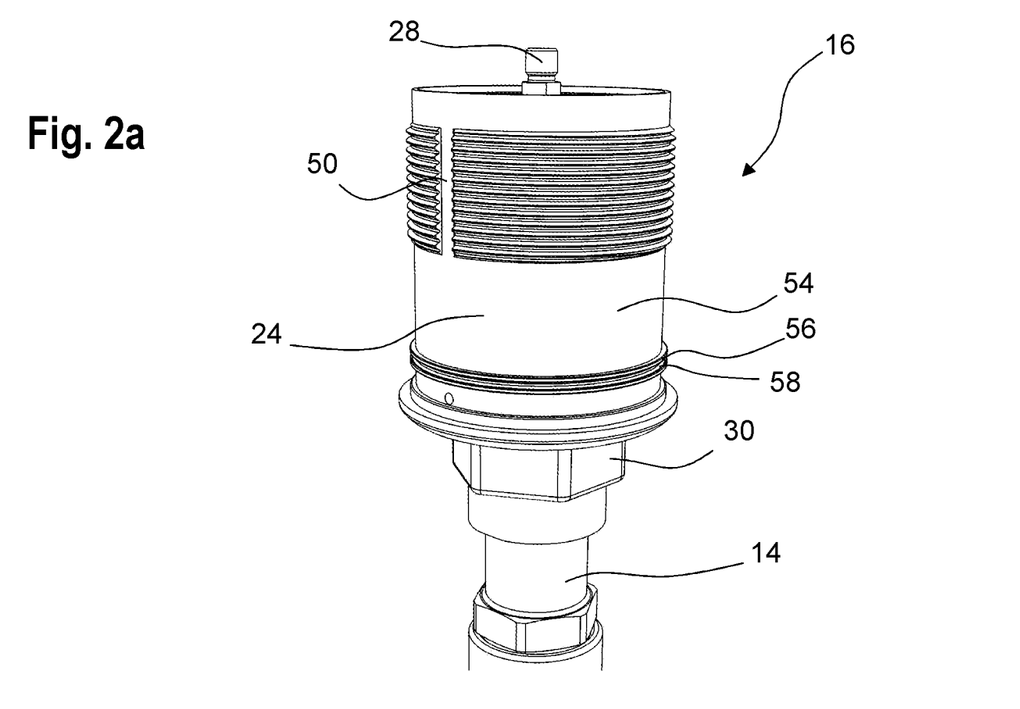
FIG. 2a shows a drive unit of the valve drive system according to the invention.
Figure 2B:
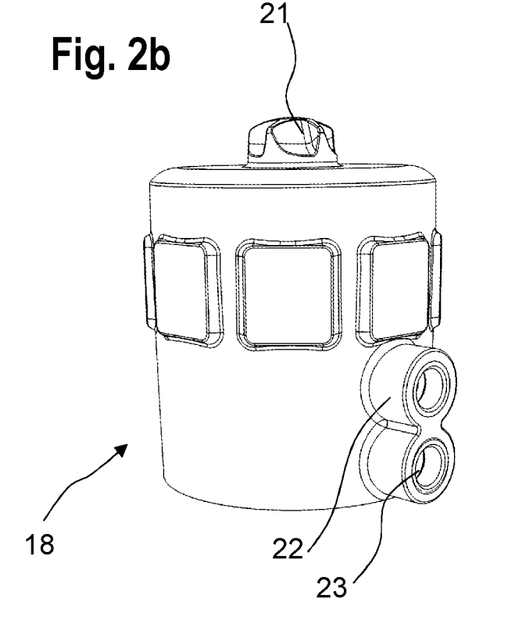
FIGS. 2b and 2c show two upper casing parts of the valve drive system according to the invention having different geometries.
Figure 2C:
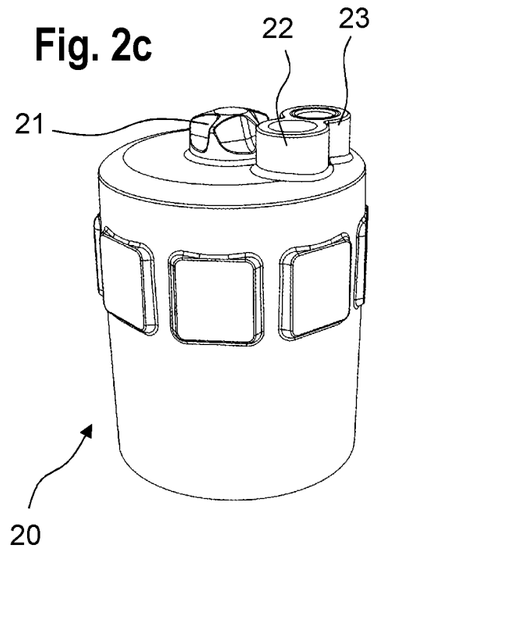

The valve drive system 10 is composed of a drive unit 16 shown in FIG. 2a and at least two upper casing parts 18, 20, which are cup-shaped and in particular integral parts, as shown in FIGS. 2b and 2c, and thus forms a modular system.

Any identical parts of the valve drive system are integrated in the drive unit 16, while only the upper casing parts 18, 20 differ regarding their geometry. In particular, the upper casing parts comprise two fluid ports 22, 23 each, wherein the upper casing parts 18, 20 are distinguished by the position of the fluid ports 22, 23. The position of the fluid ports 22, 23 may be almost arbitrarily chosen on the complete outer surface of an upper casing part 18, 20.

In the embodiment according to FIG. 2b, the fluid ports 22, 23 are arranged protruding laterally and in FIG. 2c protruding upwards at the front face. On an upper side of the upper casing parts 18, 20 a display device 21 is arranged, which displays the switch state and/or the operating state.

Figure 3:
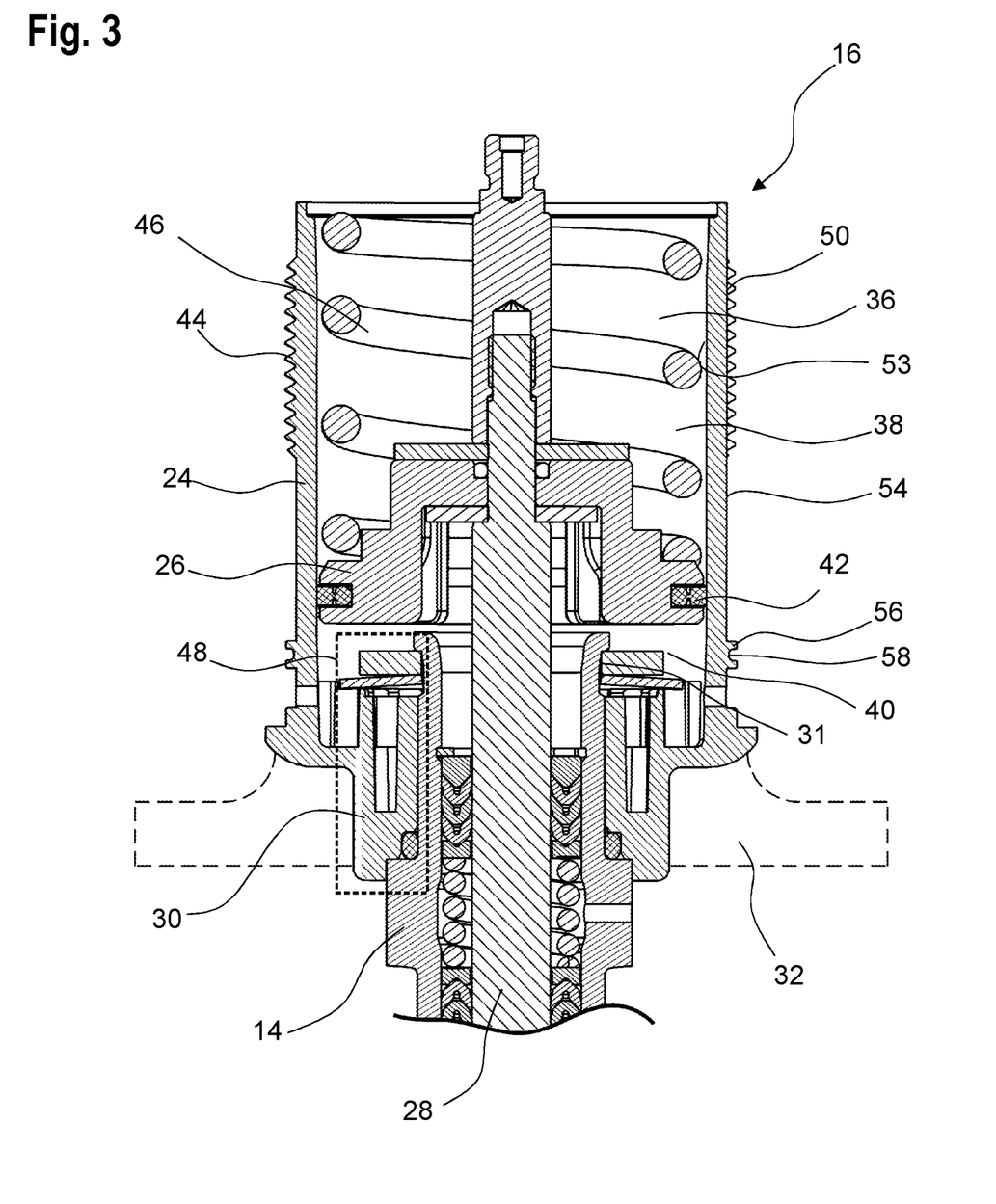
FIG. 3 shows a sectional view of a drive unit of the valve drive system according to the invention.

FIG. 3 shows a sectional view of the drive unit 16 shown in FIG. 2a. In the following, the drive unit will be described in detail referring to FIGS. 2a and 3.

The drive unit 16 comprises a sleeve 24, a piston 26, which is movable within a sleeve, a drive spindle 28 being fixedly connected to the piston 26, and a lower side bottom 30 being integrally connected to the sleeve 24. The lower side bottom 30 may comprise a flange 32, which is shown in FIG. 3 only by dashed lines.

By the lower side bottom 30 the drive unit 16 is connected to the spindle tube 14. For this purpose, a spindle tube 14 comprises a groove 31 in which a disc including a disc spring is arranged, in order to fix the lower side bottom 30 in an axial position on the spindle tube 14 in a rotatable way. Alternatively, the drive unit 16 may be directly connected to the process valve by means of the flange 32.

On an outer side of the sleeve 24, a mounting portion 44 is attached, in particular integrally configured on the sleeve 24. By the mounting portion 44, selectively one of the upper casing parts 18, 20 may be mounted to the drive unit 16. In the exemplary embodiments shown, the mounting portion 44 is configured as a thread.

In the mounting portion 44 a recess 50 is arranged, which is configured as an axial groove, which is created by gaps in the thread. The recess 50 (see FIG. 2a) forms a portion of a flow channel 52 (see FIGS. 4, 5), which is formed when an upper casing part 18, 20 is mounted to the drive unit 16.

A further portion of the flow channel 52 is formed by a peripheral outer surface 54 of the sleeve 24 beneath the thread.

Thus, the flow channel 52 extends along at least the axial height of a piston bearing surface 53 of the sleeve 24, in particular along the complete axial height of the sleeve 24.

In addition, the sleeve 24 comprises an annular portion 56 extending laterally and circumferentially along the periphery, which separates the flow channel 52 in two portions, in case an upper casing part 18 having laterally fluid ports 22, 23 is mounted, and which comprises a peripheral groove 58 (see FIG. 3), in which a sealing 64 is located. The sealing 64 divides a flow channel 52 in an upper portion 52a and a lower portion 52b in a fluid-tight way.

The upper portion 52a of the flow channel 52 is in fluid communication with the first, upper pressure chamber 38, and the lower portion 52b is in fluid communication with the second, lower pressure chamber 40.

The upper casing part 18 closes the pressure chamber 38 on a front face opposite to the piston 26, and thus closes the pressure chamber 38 by means of the sleeve 24.

In particular, by an annular portion 56 two annular chambers 66, 68 are formed, which are axially arranged one above the other in the movement direction of the piston 26, which are part of the flow channel 52.

By means of the first fluid port 22, a pressure fluid may be supplied to the first pressure chamber 38 in order to cause the movement of the piston 26 downwards. In case a pressure fluid is supplied by means of the second fluid port 23 to the lower pressure chamber 40, the piston 26 and thus the drive spindle 28 will be moved from its position against the spring force upwards.

The piston 26 divides a cylindrical chamber 36 formed within the sleeve 24 in a first pressure chamber 38, which is arranged above the piston 26, and in a second pressure chamber 40, which is arranged beneath the piston 26. By means of a sealing 42 arranged on the piston 26, the first pressure chamber 38 within the sleeve 24 is separated from the second pressure chamber 40 with respect to fluid flow. However, the upper pressure chamber 38 is finally closed to the outside by mounting of an upper casing parts 18, 22.

By combining the lower side bottom 30 and the spindle tube 14, the cylindrical chamber 36, which is formed within a sleeve 24 is closed downwards. Upwards, a cylindrical chamber 36 is closed by an upper casing part 18, 20.

In a cylindrical chamber 36 above the piston 26 a spring 46 is arranged, in particular in the first pressure chamber 38. In case an upper casing part 18, 20 is mounted on the drive unit 16, the spring 46 pressurizes the piston 26 by applying a force downwards and urges the piston and thus also the drive spindle 28 downwards. Alternatively, the spring may be arranged in the second pressure chamber 40. This way either a NO valve or a NC valve may be realized.

In the area of the lower side bottom 30 of the sleeve 24 a rotary device 48 is arranged. The rotary device 48 enables a rotation of the drive unit 16 with respect to the process valve 12.

Figure 4:
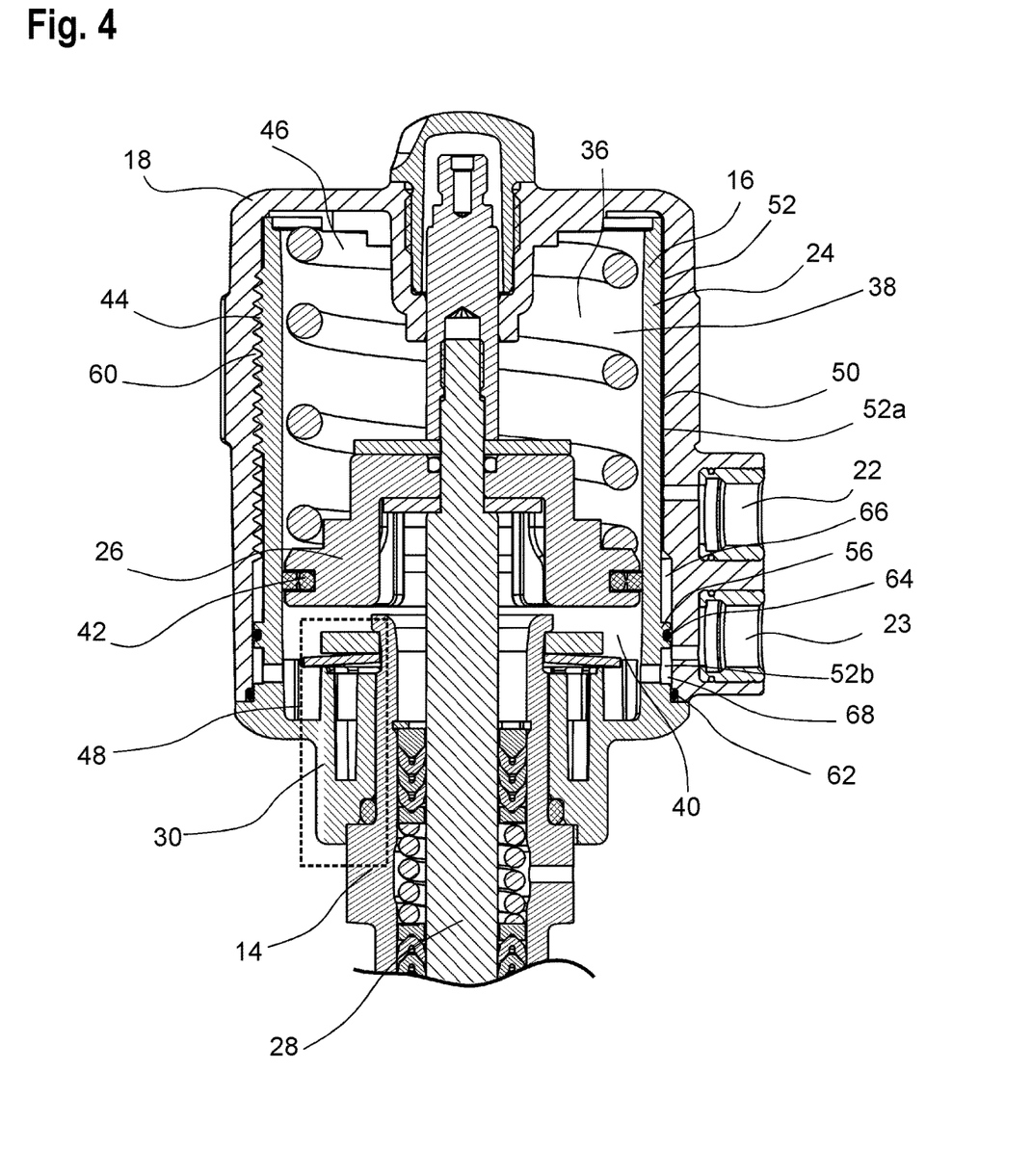
FIG. 4 shows a sectional view of the drive unit of FIG. 3 including a first upper casing part mounted on the drive unit.

FIG. 4 shows the drive unit 16 of FIG. 3, wherein the upper casing part 18 shown in FIG. 2b having laterally arranged fluid ports 22, 23, is mounted to the drive unit 16. The upper casing part 18 surrounds the sleeve 24 on the periphery and on the upper side.

The upper casing part 18 comprises a mounting portion 60 corresponding to the mounting portion 44, which is adapted as internal thread in the exemplary embodiment shown.

On the lower peripheral edge of the upper casing part 18 a sealing 62 is arranged, for example an O-ring. The sealing 62 seals the flow channel 52 towards the outside.

Figure 5:
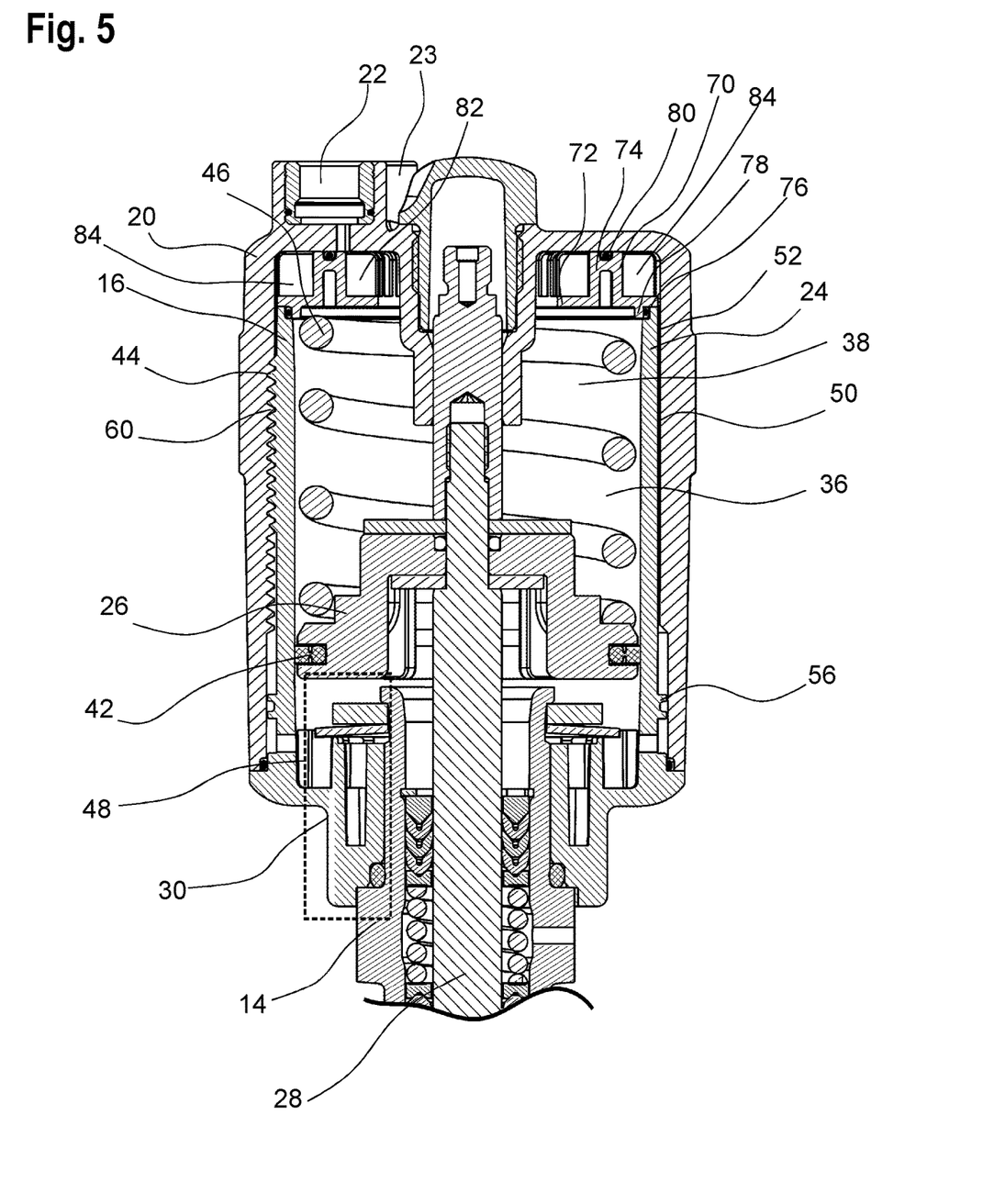
FIG. 5 shows a sectional view of the drive unit of FIG. 3 including a second upper casing part mounted on the drive unit.

FIG. 5 also shows the drive unit 16 of FIG. 3, however in this illustration the drive unit 16 is connected to the upper casing part 20, as it is shown in FIG. 2c.

The mounting of the upper casing part 20 to the drive unit 16 is performed like the mounting of the upper casing part 18, which has been described referring to FIG. 4. However, said embodiment differs in the fluid path due to a different arrangements of the fluid ports 22, 23 on the upper side of the upper casing part 20.

Between the sleeve 24 and the upper side of the upper casing part 20 a sealing insert 70 is arranged. The sealing insert 70 may is either be formed integrally with the upper casing part 20, or as a separate part, as shown in FIG. 5.

The sealing insert 70 comprises a planar basis plate 72 and a U-shaped ridge 74 which protrudes from the base plate 72 in an upward direction, that is to the upper side of the upper casing part 20.

The sealing insert 70 abuts on the sleeve 24, wherein a sealing 26, for example an O-ring, is arranged between the sleeve 24 and the sealing insert 70. The sealing 76 is held by a protrusion 78 of the sealing insert 70. On the cylindrical ridge 74 another sealing 80, in particular an O-ring, is arranged. In order to keep the sealing 80 in a defined position, a recess is arranged on top of the cylindrical ridge 74.

The sealing insert 70 is held by the casing 18, that is, also here the upper casing part 18 closes the pressure room 18 in terms of force.

The sealing insert 70 is intended to separate, in particular seal, the first pressure chamber 38 and the second pressure chamber 40 from each other regarding to fluid flow. By the sealing insert 70, the first intermediate portion 82 and the second intermediate portion 84 between the fluid ports 22, 23 and the first pressure chamber 38 or the second pressure chamber 40 are formed. The intermediate portions 82, 84 are thus configured as annular chambers being arranged to each other concentrically.

The first fluid port 22 is in fluid communication by the first intermediate portion 82 with the first pressure chamber 38. The second fluid port 23 is in communication with the intermediate portion 84, wherein the flow channel 52 extends from the second intermediate portion 84 to the second pressure chamber 40, thus the second fluid port 23 is fluidically connected to the second pressure chamber 40.

In this case, the flow channel 52 does not comprise a sealing 64 in the annular portion 56, thus a pressure fluid may flow across the annular portion 56.

As has been described in the embodiments referring to FIG. 4, this way a pressure fluid may be directed in the respective pressure chamber 38, 40 to cause a movement of the piston 26 upwards and downwards.

As is shown in FIGS. 4 to 5, an upper casing part 18, 20 and the driving unit 16 together form a closed valve drive, when the upper casing part 18, 20 is correctly mounted to the drive unit 16.

In the embodiment shown in FIGS. 4 to 5, the upper casing parts 18, 20 each extend in the longitudinal direction nearly completely across the sleeve 24, in particular to the lower side bottom 30 of the sleeve 24. In order to define the exact position of the upper casing part 18, 20, in addition, a peripheral flange may also be arranged on the bottom 30, onto which an upper casing part 18, 20 abuts in a mounted state.

The invention claimed is:

1. A valve drive system for a pneumatic or hydraulic valve comprising a drive unit and at least two cup-shaped upper casing parts having different geometries, wherein the drive unit comprises a sleeve, a piston being movable in the sleeve in a linear way, a drive spindle mounted on the piston, and a mounting portion, and wherein each of the cup-shaped upper casing parts is couplable selectively to the drive unit by means of the mounting portion to close the valve drive system to the upper side, wherein each upper casing part comprises at least one fluid port, and wherein at least one of the upper casing parts comprises as fluid port solely one or more fluid ports arranged on the front face, and at least one other upper casing part comprises as a fluid port solely one or more laterally arranged fluid ports.

2. The valve drive system according to claim 1, wherein each upper casing part comprises an upper casing mounting portion corresponding to the mounting portion of the drive unit.

3. The valve drive system according to claim 1, wherein the mounting portion is provided on the sleeve and is connected thereto in an integral way.

4. The valve drive system according to claim 1, wherein the upper casing parts have at least one sealing for sealing against the sleeve.

5. The valve drive system according to claim 1, wherein the upper casing parts enclose the sleeve around the periphery and at the upper side when mounted to the drive unit.

6. The valve drive system according to claim 1, wherein a spindle tube enclosing the drive spindle is provided, wherein a lower side bottom of the sleeve contacts the spindle tube in order to close a cylindrical chamber to the spindle tube.

7. The valve drive system according to claim 1, wherein the piston separates the cylindrical chamber in a first pressure chamber above the piston and a second pressure chamber beneath the piston, and wherein a first fluid port and/or a second fluid port is fluidly connected to the second pressure chamber, when one of the upper casing parts is mounted to the drive unit.

8. The valve drive system according to claim 7, wherein the at least one fluid port, which is coupling a pressure chamber to a fluid port is formed between the sleeve and an upper casing part and is limited thereby, when the upper casing part is arranged on the drive unit.

9. The valve drive system according to claim 8, wherein two flow channels, which are fluidically separated from each other, are formed between the sleeve and an upper casing part, when the upper casing part is arranged on the drive unit, the flow channels each extending from an assigned fluid port to the cylindrical chamber.

10. The valve drive system according to claim 8, wherein when a upper casing part having two fluid ports on an front face is mounted to the drive unit, a single flow channel is formed between the sleeve and an upper casing part and is delimited hereby, and extends to the second pressure chamber, whereas the other fluid port extends from the upper side in the first pressure chamber, and that, when a upper casing part is mounted with two lateral fluid ports on the drive unit, two flow channels, which are fluidically separated from each other, are formed between the sleeve and an upper casing part and are delimited hereby, and extend to one pressure chamber, each.

11. The valve drive system according to claim 10, wherein a circumferentially closed annular portion extends on an outer side of the sleeve which with respect to the upper casing chamber having two lateral fluid ports fluidically separates two annular chambers arranged one above the other in the axial direction, one annular chamber having an opening to the first pressure chamber and one annular chamber having an opening to the second pressure chamber.

12. The valve drive system according to claim 8, wherein the flow channel extends sectionwise through a recess in the mounting portion of the drive unit and/or is formed in the mounting section of the upper casing part.

13. Valve drive system according to claim 8, wherein the flow channel comprises an annular chamber and a portion extending axially.

14. The valve drive system according to claim 3, wherein the mounting portion provided on the sleeve is an outer thread.

15. The valve drive system according to claim 11, wherein the fluid ports in the annular chambers are arranged axially offset to one another.

16. A valve drive system for a pneumatic or hydraulic valve comprising a drive unit and at least two cup-shaped upper casing parts having different geometries, wherein the drive unit comprises a sleeve, a piston being movable in the sleeve in a linear way, a drive spindle mounted on the piston, and a mounting portion, and wherein each of the cup-shaped upper casing parts is couplable selectively to the drive unit by means of the mounting portion to close the valve drive system to the upper side, wherein the piston separates the cylindrical chamber in a first pressure chamber above the piston and a second pressure chamber beneath the piston, and wherein a first fluid port and/or a second fluid port is fluidly connected to the second pressure chamber, when one of the upper casing parts is mounted to the drive unit.

17. A valve drive system for a pneumatic or hydraulic valve comprising a drive unit and at least two cup-shaped upper casing parts having different geometries, wherein the drive unit comprises a sleeve, a piston being movable in the sleeve in a linear way, a drive spindle mounted on the piston, and a mounting portion, and wherein each of the cup-shaped upper casing parts is couplable selectively to the drive unit by means of the mounting portion to close the valve drive system to the upper side, wherein together, the upper casing part and the drive unit form a closed valve drive, when the upper casing part being correctly mounted on the drive unit.

* * * * *